United States Patent
Kaynak et al.

(10) Patent No.: US 12,487,758 B1
(45) Date of Patent: Dec. 2, 2025

(54) ERROR DECODING WITH SOFT REDUNDANT ARRAY OF INDEPENDENT NAND (RAIN)

(71) Applicant: MICRON TECHNOLOGY, INC., Boise, ID (US)

(72) Inventors: Mustafa N. Kaynak, San Diego, CA (US); Sivagnanam Parthasarathy, Carlsbad, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 18/784,528

(22) Filed: Jul. 25, 2024

(51) Int. Cl.
*G06F 3/06* (2006.01)
*G06F 11/10* (2006.01)
*H03M 13/11* (2006.01)

(52) U.S. Cl.
CPC .......... *G06F 3/0619* (2013.01); *G06F 3/0655* (2013.01); *G06F 3/0679* (2013.01); *G06F 11/1048* (2013.01); *G06F 11/1076* (2013.01); *H03M 13/1102* (2013.01)

(58) Field of Classification Search
None
See application file for complete search history.

(56) References Cited

U.S. PATENT DOCUMENTS

| | | | |
|---|---|---|---|
| 11,258,466 B1* | 2/2022 | Kanter | G06F 11/1012 |
| 2017/0192858 A1* | 7/2017 | Zhang | G06F 11/2017 |
| 2019/0140660 A1* | 5/2019 | Palangappa | G11C 29/04 |
| 2024/0054051 A1* | 2/2024 | Parashari | H03M 13/611 |
| 2025/0095766 A1* | 3/2025 | Zhou | G11C 29/021 |

* cited by examiner

Primary Examiner — Kaushikkumar M Patel
(74) Attorney, Agent, or Firm — Tarolli, Sundheim, Covell & Tummino LLP

(57) ABSTRACT

A controller decodes embedded data from a codeword determined to have errors via a soft decoding process based on a first LLR set assigned to bits of the codeword by a controller. The controller accesses a set of bit-wise redundant array of independent NAND (RAIN) parity bits from the memory device or another memory device in response to determining failure of the soft decoding process. The controller decodes the embedded data from the codeword via a first soft RAIN decoding process based on a second LLR set and the RAIN parity bits by the controller, and decodes the embedded data from the codeword via a second soft RAIN decoding process based on a third LLR set and the RAIN parity bits by the controller in response to determining failure of the first soft RAIN decoding process.

20 Claims, 6 Drawing Sheets

ERROR DECODING WITH SOFT REDUNDANT ARRAY OF INDEPENDENT NAND (RAIN)

TECHNICAL FIELD

This disclosure relates to decoding to correct errors in data, and particularly to error decoding with soft redundant array of independent NAND (RAIN).

BACKGROUND

A memory sub-system includes a memory device designed for data storage. These memory devices are implemented as non-volatile and volatile memory devices in various examples. In some such examples, a host system employs a memory sub-system for the purposes of storing data on the memory devices and for retrieving data from the memory devices. In certain circumstances, data retrieved from memory has errors that can be corrected by error encoding and decoding techniques. Soft decoding is a type of error-correcting decoding utilized in memory correction that implements an error correction code that characterizes a reliability of determined bit values of data transmitted over communication channels with high efficiency and reliability.

DETAILED DESCRIPTION

Figure 1A:
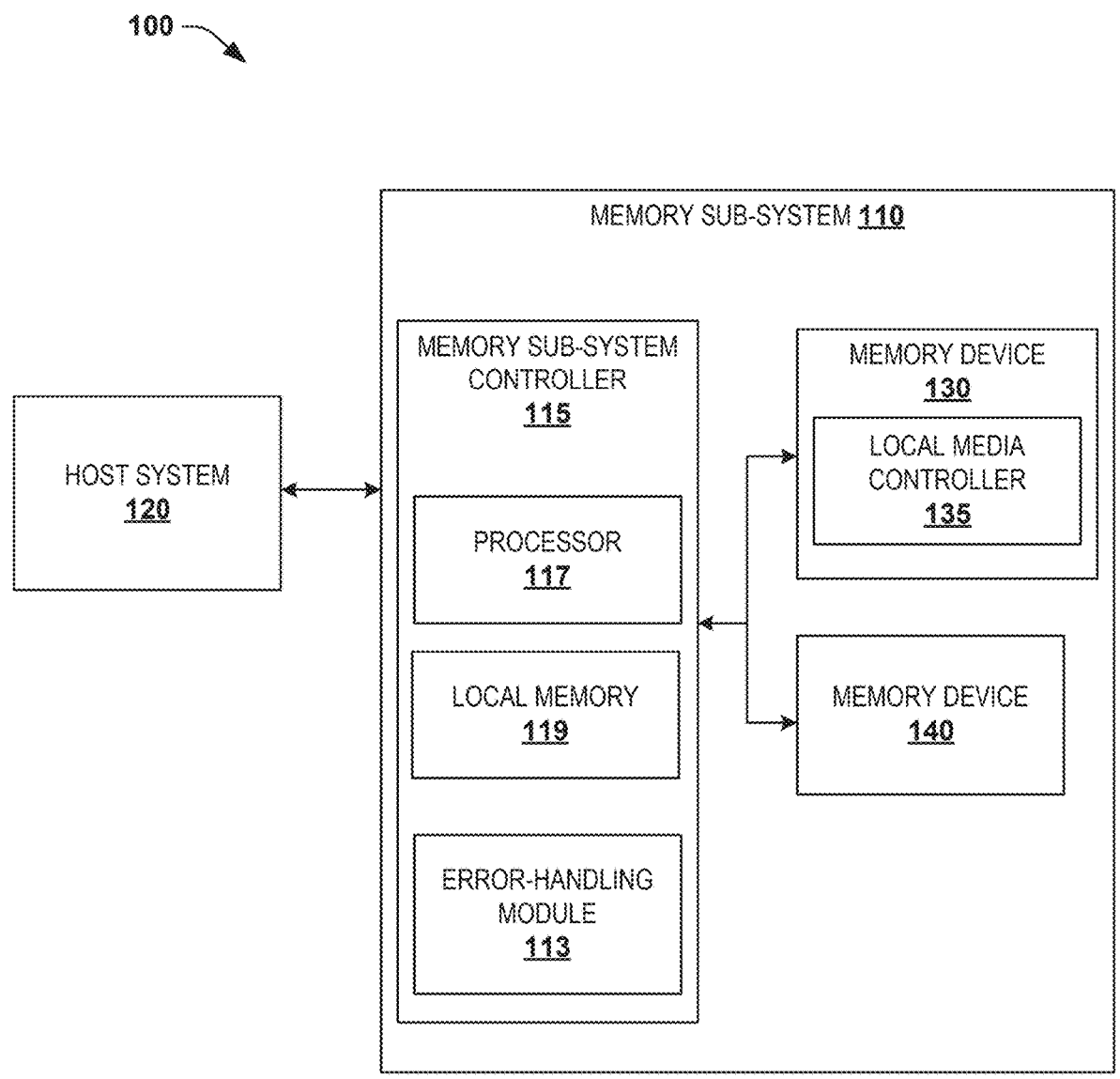
FIG. 1A illustrates system for decoding data from a memory sub-system.

This disclosure relates to soft decoding to correct errors in data, and particularly to error decoding with soft redundant array of independent NAND (RAIN). The error decoding described herein provides adaptive error-handling to curtail an impact of a wide range of high-reliability error rates (HRERs) on soft decoding algorithms, such as low density parity-check (LDPC) algorithms with irregular LDPC codes. As described in greater detail herein, RAIN recovery is implemented to recover data based on bit-wise data of each of different sets of data being provided to an XOR logic operation to provide a respective RAIN parity bit. As also described in greater detail herein, a soft RAIN decoding process is implemented as a soft decoding process that includes the RAIN parity bits for parity checks to provide additional capability of for error correction of data that includes bit-errors.

The decoding process described herein implements error correction using a plurality of soft RAIN recovery decoding processes that each use a different log-likelihood ratio (LLR) set. The different LLR sets can be optimized for different HRERs. For example, in the event of failure of a first soft RAIN recovery decoding process to decode a codeword using a first LLR set, the decoder can implement a second soft RAIN recovery decoding process to decode the codeword using a second LLR set that is different from the first LLR set (e.g., is optimized for a higher HRER). The soft RAIN recovery decoding process(es) described herein can therefore provide for more effective decoding of a broader range of bit errors of codewords, such as codewords having a high HRER that can be uncorrectable by some LLR sets in other soft decoding process.

A memory sub-system refers to a storage device, a memory module or some combination thereof. The memory sub-system includes a memory device or multiple memory devices that store data. The memory devices could be volatile or non-volatile memory devices. Some examples of a memory sub-system include high density non-volatile memory devices where retention of data is desired during intervals of time where no power is supplied to the memory device. One example of a non-volatile memory device is a not-AND (NAND) memory device. A non-volatile memory device is a package that includes a die(s). Each such die can include a plane(s). For some types of non-volatile memory devices (e.g., NAND memory devices), each plane includes a set of physical blocks, and each physical block includes a set of pages. Each page includes a set of memory cells, which are commonly referred to as cells. A cell is an electronic circuit that stores information. A cell stores at least one bit of binary information and has various logic states that correlate to the number of bits being stored. The logic states are be represented by binary values, such as '0' and '1', or as combinations of such values, such as '00', '01', '10' and '11'.

A memory device includes multiple cells arranged in a two-dimensional or a three-dimensional array. In some examples, memory cells are formed on a silicon wafer in an array of columns connected by conductive lines (also referred to as bitlines, or BLs) and rows connected by conductive lines (also referred to as wordlines or WLs). A wordline is a row of associated memory cells in a memory device that are used with a bitline or multiple bitlines to generate the address of each of the memory cells. The intersection of a bitline and a wordline defines an address of a given memory cell.

A block refers to a unit of the memory device used to store data. In various examples, the unit could be implemented as a group of memory cells, a wordline group, a wordline or as individual memory cells. Multiple blocks are grouped together to form separate partitions (e.g., planes) of the memory device to enable concurrent operations to take place on each plane. A solid-state drive (SSD) is an example of a memory sub-system that includes a non-volatile memory device(s) and a memory sub-system controller to manage the non-volatile memory devices.

The memory sub-system controller is configured/programmed to encode the host and other data, as part of a write operation, into a format for storage at the memory device(s). Encoding refers to a process of generating parity bits from embedded data (e.g., a sequence of binary bits) using an error correction code (ECC) and combining the parity bits to the embedded data to generate a codeword. As described in greater detail herein, the term "soft" refers to a probability or reliability of a value of a given bit, and can be defined by one or more soft bits.

One example of soft information usage is in decoding for memory that utilizes LDPC. As example, an LDPC code is defined by, among other things, a sparse parity-check matrix, alternatively referred to as an H matrix, denoted as $\bar{H}$. Each row of the H matrix embodies a linear constraint imposed on a designated subset of data bits. Entries within the H matrix, either '0' or '1', signify the participation of individual data bits in each constraint. Stated differently, each row of the H matrix represents a parity-check equation, and each column corresponds to a bit in the codeword. During encoding, using the embedded data along with either the H matrix or the generator matrix, which is the inverse of the H matrix, generates parity bits. The generated parity bits are appended to the embedded data to generate an LDPC codeword. The LDPC codeword includes the embedded data and the parity bits, allowing for identification and rectification of errors. The LDPC codeword is storable at the memory device(s) of the memory sub-system.

Additionally, the memory sub-system controller can decode codewords, as part of a read operation, stored at the memory device(s) of the memory sub-system. Decoding refers to a process of reconstructing the original embedded data (e.g., sequence of binary bits) from the codeword (e.g., the encoded original embedded data) received from storage at the memory device(s). LDPC decoding refers to a decoding method that utilizes the LDPC code to reconstruct the original embedded data.

Initially, during LDPC decoding, the LDPC codeword is compared with the expected relationships encoded in the H matrix. In particular, the LDPC codeword is multiplied by a transpose of the H matrix associated with the LDPC code used to encode the LDPC codeword. This operation can also be performed without making a matrix multiplication by sequentially checking each parity using XOR operations. The result of the multiplication produces a vector (e.g., a syndrome vector), in which each element corresponds to a specific parity-check equation in the sparse parity-check matrix. The number of non-zero entries in the syndrome vector corresponds to the non-satisfied (e.g., failed) parity checks, and the number of non-satisfied parity checks is the syndrome weight. A syndrome vector with zero values signifies that the corresponding parity-check equation is satisfied (e.g., no errors or having even number of bit errors in the parity check equation), and a syndrome vector with non-zero values indicates potential errors impacting the bits involved in the corresponding parity-check equation. Potential errors, for example, may be due to the bits involved in the corresponding parity-check equation being flipped due to noise, interference, distortion, bit synchronization errors or errors from the media itself (both intrinsic and extrinsic). For example, a bit that may have originally been stored as a '0' may be flipped to a '1' or vice versa.

In response to detection of the potential errors, an algorithm of the LDPC decoding, such as a MinSum (alternatively referred to as min-sum) algorithm, iteratively analyzes the LDPC codeword and estimates the most likely values for the data bits. In particular, the algorithm of the LDPC decoding (e.g., decoding algorithm) is initialized with either hard decisions and/or soft decisions of the LDPC codeword. Hard decisions refer to binary decisions made about the LDPC codeword, where each bit is classified as either '0' or '1' based on a threshold. Soft decisions refer a likelihood or confidence score indicating how likely each bit is to be classified as either '0' or '1'. In some instances, soft decisions may be represented as a log-likelihood ratio (LLR) set, in which each LLR of the LLR set is a value that indicates a likelihood or confidence score of a bit of the LDPC codeword to be classified as either '0' or '1'. The LLR is a ratio of the probabilities of receiving a particular signal given the bit is '0' versus the bit being '1' or vice versa. A positive LLR (e.g., a positive value) indicates that '0' is a more likely decision, whereas a negative LLR (e.g., a negative value) indicates that '1' is a more likely decision. The magnitude of the LLR indicates the confidence in this decision. A higher magnitude (or larger value) suggests higher confidence in the decision.

Subsequent to initializing the decoding algorithm with either hard decisions or soft decisions of the LDPC codeword, the decoding algorithm, using a tanner graph, iteratively exchanges messages within the tanner graph. The tanner graph refers to a bipartite graph representation of the H matrix of the LDPC code. The tanner graph includes two types of nodes (i) variable nodes (representing the bits of the codeword) and (ii) check nodes (representing the parity-check equations). Each check node is connected to several variable nodes. The decoding algorithm iteratively exchanges messages within the tanner graph by iteratively exchanging messages between variable nodes and check nodes.

With respect to the decoding algorithm initialized with hard decisions, during each iteration, each check node sends a message to each connected variable node based on the hard decisions. The messages are based on the initialized hard decisions made. That is, the messages indicate a definite '0' or '1'. The variable nodes update their values based on these hard decision messages, and this process repeats iteratively. The decoding algorithm iterates, with each node updating its value based on the incoming messages until the decoding algorithm converges to a stable set of values that satisfy the parity-check equations of the H matrix of the LDPC code or until a maximum number of iterations is reached. This decoder can be considered a hard decision decoder.

With respect to the decoding algorithm initialized with soft decisions, during each iteration, each check node computes and sends a message to each connected variable node based on the soft decisions. The message reflects the likelihood of that a particular bit satisfies the corresponding parity-check equation, given the current estimates of the other bits, based on the initialized soft decisions, involved in that particular parity check. Each connected variable node, based on the message computed by the corresponding check node, and each connected variable node updates its estimate, (e.g., the LLR for the corresponding variable node). For example, the update can include increasing the estimate of a reliability value of the variable node (e.g., "rewarding" the LLR value) in response to a passed parity check, and can include decreasing the estimate of the reliability value of the variable node (e.g., "penalizing" the LLR value) in response to a failed parity check. Each connected variable node sends back an updated message to the check node, which influences the next message from the check node. This iterative process gradually refines the estimates of the likelihood for each bit, aiming to converge to a consistent set of values that satisfy all parity-check equations (syndrome weight=0) of the H matrix of the LDPC code or until a maximum number of iterations is reached. The use of soft decisions in the decoding algorithm is computationally more complex than the hard decisions in the decoding algorithm, but generally results in more accurate decoding, such as to provide an increased reliability of the error-correction capability, and thus a higher error rate that can be corrected by LDPC.

Codeword error rate (CWER) refers to a metric used to quantify a correction capability of the decoding algorithm. Stated differently, CWER reflects the number of codewords out of a collection of codewords that have at least one bit error after the decoding process. A lower CWER implies better decoding performance and higher reliability, while a higher CWER suggests that the algorithm may struggle to effectively correct errors. With respect to using hard information with the decoding algorithm, CWER is functionally dependent on the raw-bit-error-rate (RBER), which is a raw measure of errors occurring in the absence of any correction.

With respect to using soft information with the decoding algorithm, CWER is functionally dependent on the RBER and a high reliability error rate (HRER), which measures the reliability of bits marked as "highly reliable" by the soft input. More specifically, HRER quantifies the error rate among bits identified as "highly reliable" based on soft information. Accordingly, for a given RBER, an increase in the HRER leads to an increase in the CWER. This relationship suggests that when more errors are falsely assigned high reliability values, it becomes more challenging for the decoding algorithm to correctly reconstruct the original codewords, thus leading to a higher CWER. Consequently, the CWER is a function of HRER and LDPC type. Accordingly, decoders may employ specific operations to handle different types of LDPC codes and HRER levels to tune error-correction capabilities.

In addition to the LDPC decoding process described herein, data errors can also be recovered by the memory sub-system controller via redundant array of independent NAND (RAIN) recovery. In RAIN recovery, bit-wise data of each of different sets of data is provided to an XOR logic operation to provide a respective RAIN parity bit. RAIN recovery is typically implemented to recover data that is lost from die failure or other types of data losses due to defects. For example, each bit from each of different data sources (e.g., dies, rows of a memory array, codewords, etc.) can be aggregated in an XOR logic operation in a bit-wise manner to provide the corresponding RAIN parity bit. The data bits that are aggregated in the XOR logic operation to generate a single RAIN parity bit is referred to hereinafter as a "RAIN stripe." Therefore, by evaluating the RAIN parity bits, data that is lost from one of the data sources can be recovered based on the value of the RAIN parity bits.

As described herein, the memory sub-system controller can also implement error correction of codeword errors via a soft RAIN recovery decoding process (also described herein as "soft RAIN LDPC decoding process"). As an example, soft RAIN recovery can implement the LDPC decoding process described above using the parity bits encoded to form the syndrome vector, as well as the RAIN parity bits (e.g., as an additional parity bit in each check node) to detect and correct codewords. Similar to a standard LDPC decoding process, the soft RAIN recovery process can implement an LLR set for providing weighted parity checks of check nodes in an iterative manner that rewards and penalizes LLR values based on the results of the parity checks, including the RAIN parity bits. As described herein, the memory sub-system controller can implement a plurality of different LLR sets in the soft RAIN recovery decoding process, such as to accommodate a codewords having a higher HRER. Therefore, soft RAIN recovery can provide an additional data recovery process beyond a standard LDPC decoding process and RAIN recovery, thereby providing for a more robust data error correction.

To initiate the decoding process, the memory sub-system controller receives a codeword sent over a communication channel. The memory sub-system controller calculates a syndrome vector which indicates that the codeword includes errors. As described herein, the LDPC decoding process is enhanced by implementing a soft RAIN LDPC decoding process based on RAIN parity bits and multiple LLR sets. As an example, some LLR sets can operate more effectively in LDPC decoding across a certain range of HRER of codewords, but the same LLR sets can operate less effectively for a different range HRER. For example, some LLR sets operate more effectively in LDPC decoding for codewords having higher HRER, but less effectively for codewords having lower HRER.

To mitigate the impact of HRER in irregular LDPC codes, the memory sub-system controller described herein can implement a soft RAIN recovery decoding process that utilizes the RAIN parity bits in response to failure of an initial standard LDPC decoding process. For example, in response to determining failure of a standard LDPC decoding process, the memory sub-system controller can implement a first soft RAIN recovery decoding process. The first soft RAIN recovery decoding process can implement a first LLR set having LLR values that can correspond to an average or typical HRER range of the memory device.

As described herein, the term "average HRER" can correspond to a first range of values of HRER that is relatively lower, and can thus correspond to a broad range of codewords up to a certain value of HRER, thereby providing a high likelihood of successful decoding for these codewords. However, as described above, some LLR sets are more effective for decoding codewords having higher HRER values while being less effective at decoding codewords having lower HRER values. Therefore, in response to failure of the first soft RAIN recovery decoding process, the memory sub-system controller can implement a second soft RAIN recovery decoding process that implements a second LLR set having LLR values that are optimized to decode codewords having a second range of HRER values, a portion of which is greater than the values of the first range of HRER. Therefore, the second LLR set can have LLR values that are optimized to decode codewords having HRER values that are greater than the average HRER values, and are thus more effective for decoding codewords having higher HRER values. Therefore, the decoder can exhibit an enhanced ability to correct errors with soft RAIN recovery under varying conditions, particularly in scenarios with higher HRER values.

The systems and methods of the present description enhance the error correction capability of LDPC decoders, particularly in challenging conditions characterized by high HRER. Moreover, the systems and methods improve the efficiency of the decoding process, potentially reducing the time and computational resources required to achieve reliable data recovery. These enhancements to the LDPC decoder have implications for systems where data integrity and reliability are significant, such as in SSDs (solid-state drives), communication systems and data centers. By improving the performance of LDPC decoders in the presence of high HRER, the described systems and methods lead to more robust data storage and transmission solutions, enhancing the overall reliability and efficiency of these systems. The described operations of the enhanced LDPC decoder implements a practical solution to a problem in the decoding of irregular LDPC codes, effectively addressing the challenges posed by HRER and impacting the reliability and efficiency of modern data communication and storage systems.

FIG. 1A illustrates a system 100 that includes a memory sub-system 110 that can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card and a hard disk drive (HDD). Examples of memory modules include a dual in-line memory module (DIMM), a small outline DIMM (SO-DIMM) and various types of non-volatile dual in-line memory modules (NVDIMMs).

The system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment or a networked commercial device) or such computing device that includes memory and a processing device. The system 100 can include a host system 120 that is coupled to one or more memory sub-systems 110. In some examples, the host system 120 is coupled to different types of the memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory device(s) 130) when the memory sub-system 110 is coupled with the host system 120 by the physical host interface (e.g., PCIe or CXL bus). The physical host interface can provide an interface for passing control, address, data and other signals between the memory sub-system 110 and the host system 120. FIG. 1A illustrates a memory sub-system 110 as an example. In general, the host system 120 can access multiple memory sub-systems via a same communication connection, multiple separate communication connections and/or a combination of communication connections.

The memory device 130 and the memory device 140 are implemented as non-transitory computer readable media. The memory device 130 and the memory device 140 can include any combination of the different types of non-volatile memory devices and/or volatile memory devices. The volatile memory devices (e.g., the memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) or higher, can store multiple bits per cell. In some examples, each of the memory devices 130 can include one or more arrays of memory cells such as SLCs, MLCs, TLCs, QLCs or some combination thereof. In some examples, a particular memory device can include an SLC portion, an MLC portion, a TLC portion and/or a QLC portion of memory cells. The memory cells of the memory devices 130 can be grouped as pages that can refer to a logical unit of the memory device used to store data. In some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), etc.

A memory sub-system controller 115 (or controller 115 for simplicity) communicates with the memory device(s) 130 to perform operations such as reading data, writing data or erasing data at the memory devices 130 and other such operations. The memory sub-system controller 115 can include hardware such as one or more integrated circuits and/or discrete components, a buffer memory or some combination thereof. The hardware can include a digital circuitry with dedicated (e.g., hard-coded) logic to perform the operations described herein. The memory sub-system controller 115 can be a microcontroller, special purpose logic circuitry (e.g., a field programmable gate array (FPGA), an application specific integrated circuit (ASIC), etc.) or another suitable processor.

The memory sub-system controller 115 can include a processing device, which includes one or more processors (e.g., the processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. The local memory 119 is a non-transitory computer-readable medium.

In some examples, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another example, a memory sub-system 110 does not include a memory sub-system controller 115 and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations and address translations between a logical address (e.g., a logical block address (LBA), namespace) and a physical address (e.g., physical block address) that are associated with the memory devices 130. The memory sub-system controller 115, for example, may employ a Flash Translation Layer (FTL) to translate logical addresses to corresponding physical memory addresses, which can be stored in one or more FTL mapping tables. In some instances, the FTL mapping table can be referred to as a logical-to-physical (L2P) mapping table storing L2P mapping information. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. For example, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in concert with the memory sub-system controller 115 to execute operations on one or more memory cells of the memory devices 130. An external controller (e.g., the memory sub-system controller 115) can externally manage the memory device 130 (e.g., perform media management operations on the memory device 130). In some examples, the memory sub-system 110 is a managed memory device, which is a raw memory device 130 having control logic (e.g., local media controller 135) on the die and a controller (e.g., the memory sub-system controller 115) for media management within the same memory device package. An example of a managed memory device is a managed NAND (MNAND) device.

In various examples, the memory sub-system 110 includes an error-handling module 113 that tries to execute a decoding algorithm with various combinations of log-likelihood ratio (LLR) sets to compensate for HRER and a range of CW in the H matrix of the soft code, such as an LDPC code. In some examples, the memory sub-system controller 115 includes at least a portion of the error-handling module 113. In some examples, the error-handling module 113 is part of the host system 120, an application or an operating system. In other examples, local media controller 135 includes a portion of the error-handling module 113 and is configured to perform the functionality described herein.

In operation, the host system 120 manages and controls the flow of data between itself and the memory sub-system 110, ensuring efficient data storage and retrieval operations. More generally, the host system 120 employs the memory sub-system 110 to write data to and read data from the memory sub-system 110. For instance, the host system 120 processes these request for reading and/or write data by interacting with the memory sub-system 110, managing the flow of data to and from the memory device 130 and/or the memory device 140 within the memory sub-system 110. This reading and writing of data enables operation of computing systems where data access and management is needed.

Continuing with examples of operation, the host system 120 can output a read memory command to the memory sub-system controller 115. In response, the memory sub-system controller 115 can operate in concert with the local media controller 135 to read memory cells of the memory device 130 and/or the memory device 140. The memory sub-system controller 115 can store retrieved data in the form of codewords (e.g., LDPC codewords formed of a combination of embedded data and parity bits) in the local memory 119. It is presumed that the data that is read from the memory device 130 and the memory device 140 includes hard reads (1H) and soft reads (1H2S). A soft read (1H2S) is a combination of a hard bit (1H) and two soft bits (2S). In addition, for soft information, the reads can be coarser in granularity, such as 1H1S, or finer in granularity, such as 1HNS where N is greater than two. For example, in the "1HNS" notation, N refers to the number of additional NAND page soft reads provided in addition to the hard read to extract soft information. Higher values of N result in finer granularity of the soft information, as well as longer read times The "hard bit" in this context is a binary read of data where each bit is read and immediately interpreted as either a '0' or a '1', based on a fixed threshold. For example, in NAND flash memory, a voltage level above a certain threshold voltage ($V_t$) might be interpreted as '0', and below that threshold as '1'. Hard reads are quick and require less computational power but provide less information about the reliability of the read bit. The "soft bits" provide additional information about the probability or confidence level of the bit being a '0' or '1'. In the present description, the confidence level of the bit is represented in terms of likelihoods or probabilities, which can be converted into an LLR set for use in decoding algorithms. Soft reads (1H2S) are employable in error correction because soft reads (such as 1H2S) allow a decoder algorithm of the error-handling module 113 to make more informed decisions based on the degree of certainty about each bit's state. The combination of 1H2S forming the soft read is effective in systems where both speed and data integrity are considered. The hard read forming the hard bit (1H) provides a quick initial assessment of each bit, and the soft bits (2S) offer deeper insights into the potential errors, enhancing the error correction capability of the decoder algorithm of the error-handling module 113.

Furthermore, soft reads (1H2S) provide an indication of reliability of each bit. In the present examples, it is presumed that the reliability is one of three levels: low, medium, and high, but in other examples, more or fewer levels can be employed. The reliability of the soft read can be determined by comparing the consistency of the soft bits (2S) with the hard bit (1H) of the soft read (1H2S). Moreover, in other examples, the soft read (1H2S) can be a multibit read that provides a finer resolution reliability. Additionally, other criteria are employable to determine the reliability of bits in various examples.

As noted, codeword error rate (CWER) measures the ability of the decoding algorithm to correct errors, indicating the proportion of codewords with errors post-decoding. A lower CWER signifies better performance and reliability. For hard information, CWER depends on the raw-bit-error-rate (RBER), a basic error measure without correction. For soft reads (1H2S), CWER also relies on the high reliability error rate (HRER), which assesses the error rate among bits deemed "highly reliable." An increase in HRER, indicating more errors wrongly marked as reliable, complicates error correction, raising the CWER. As one example, suppose that RBER is 1% and the HRER is 0.1%, the HRER/RBER ratio would be 10%. Conversely, in a situation where the RBER is 1% but HRER is 0.3% (an increase of 0.2%), the HRER/RBER ratio would be 30%. In this example, CWER for HRER/RBER=10% will be lower than CWER for HRER/RBER=30% even though RBER is the same for both cases.

Continuing with the example, the error-handling module 113 can parse the codewords in the local memory 119 to detect and correct bit errors. In one example, the error-handling module 113 detects that a codeword (e.g., LDPC codeword) read from memory device 130 and/or the memory device 140 contains bit errors. To detect errors, the error-handling module 113 can multiply a transverse of the H matrix of the code (e.g., LDPC code) with the codeword to provide a syndrome vector. If the syndrome vector is non-zero, there is at least one error in the codeword. Moreover, the values of the non-zero syndrome vector are employable to identify check nodes of the code that have failed parity checks.

The error-handling module 113 generates a decoding parameter to be employed in performing a decoding algorithm. The decoding parameter is a particular codeword LLR, in which the error-handling module 113 assigns an input LLR set from the LLR array to each bit of the codeword. Each bit in the codeword read from the memory device 130 and/or the memory device 140 has a column weight (CW) that defines the number of parity checks in which the corresponding bit participates. The calculation or determination of CW for each bit of the codeword with parity errors is related to the structure of the H matrix (parity check matrix) of the code, which is a binary matrix where rows represent parity checks and columns represent codeword bits. Each entry in the H matrix is either '0' or '1'; a '1' indicates that the corresponding bit is included in the parity check for that row. To calculate the CW for a specific bit, the number of '1's in the column of the H matrix that corresponds to that bit are counted. For example, if a column has three '1's, the CW for that bit is three (3), meaning the bit is involved in three (3) different parity checks. This count influences the decoding process, as bits with higher CWs have a greater impact on the overall parity check outcomes, impacting both the error correction capability and the complexity of the decoding process.

As described herein, the LLR sets can each include different integer values that are mapped to specific reliabilities. The particular values can be based for example, on different values or ranges of values of HRER of codewords in the memory device. Table 1 provides an example of an LLR set that correlates a soft read (1H2S) bit value and reliability with a particular LLR value.

TABLE 1

| Bit Value | Reliability | LLR Value |
|---|---|---|
| 1 | High | −14 |
| 1 | Medium | −10 |
| 1 | Low | −5 |
| 0 | Low | 5 |
| 0 | Medium | 10 |
| 0 | High | 14 |

It is noted that the particular values for the LLR set defined in Table 1 can correspond to LLR values that are optimized for an average HRER, and can thus be optimized to decode a broad range of codewords.

As an example, each variable node (corresponding to a bit in the codeword) is initialized with the corresponding LLR set of the codeword LLR, referred to as initial LLR values denoted as $L_{INIT}$. These initial LLR values are employed in an iterative process, exchanging messages between variable nodes and associated check nodes. For example, if a variable node V is connected to three check nodes C1, C2 and C3, messages mC1→V, mC2→V and mC3→V (e.g., each mC1 . . . mC3 representing the message that is passed from check node to variable node) would be computed based on existing LLRs and specific rules.

As an example, the error-handling module 113 can employ a MinSum decoder, which is alternatively referred to as a min-sum decoder. The MinSum decoder is a streamlined decoding algorithm used with codes (e.g., LDPC codes), offering a computationally efficient alternative to the more complex Belief Propagation (BP) algorithm. The MinSum decoder operates by iteratively passing messages between variable nodes (representing codeword bits) and check nodes (representing parity checks) within a Tanner graph of the code. The MinSum decoder implements an iterative error correction process that employs two specific values, min1 and min2. During each iteration, the decoder of the error-handling module 113 operates through a series of message exchanges between the variable nodes and check nodes. Each check node receives messages from connected variable nodes, which contain information about the LLRs of bit values. The check node determines whether the parity condition represents by the check node is satisfied based on these incoming messages.

To update the messages sent back to the variable nodes, the MinSum decoder calculates the two smallest absolute values (min1 and min2) among the incoming messages at each check node. Min1 is the smallest absolute value and min2 is the second smallest. Responsive to determining min1 and min2, the check node updates the outgoing message based on min1 and min2. If a parity check fails, indicating that there is an inconsistency among the bits involved in that check, the check node sends back messages that adjust (e.g., penalize) the reliability values of the connected variable nodes. Specifically, the variable node associated with min1 (the least reliable node based on the incoming messages) receives an update influenced by min2, and every other variable node connected to the check node receives an update influenced by min1. Thus, the MinSum decoder ensures that the least reliable bit is given the most significant adjustment, pushing the least reliable bit towards correction in subsequent iterations. Scalar values and offset values can be applied to min1 and min2 in the MinSum decoder to more closely approximate the operation of a decoder that employs the BP algorithm.

As an example, an example, consider a situation where a scalar value denoted as 's' and offset value denoted as 'o', mC1→V=s*min1 (or min 2)+o where min1 and min2 correspond to smallest/second smallest LLR to check node C1. After the first iteration, the LLR for V would be updated using the formula and the set of decoding parameters (e.g., $L_{NEW}=(L_{INIT})+mC1\rightarrow V+mC2\rightarrow V+mC3\rightarrow V$); where $L_{INIT}$ corresponds to the initial assigned LLR value). The process is then repeated for a set number of iterations or until certain conditions are met, using the updated $L_{NEW}$ as the starting point for the next round. Finally, a hard decision is made based on the resulting $L_{FINAL}$; if $L_{FINAL}>0$, the bit is decoded as '1', and if $L_{FINAL}<0$, it is decoded as '0'. Accordingly, if the LLR of a given bit is changed from positive to negative through an iteration, the bit is flipped from '0' to '1'. Conversely, if the LLR of a given bit is changed from negative to positive through an iteration, the given bit is flipped from '1' to '0'. This iterative mechanism allows for more effective error correction by continually updating the LLRs.

The soft encoding and decoding processes described hereinafter are referred to as LDPC encoding and LDPC decoding, respectively. However, LDPC encoding/decoding is one type of soft encoding/decoding, and the principles described herein can be applicable to other types of encoding and decoding processes.

If the decoding algorithm executed by the error-handling module 113 is unable to correctly decode the codeword, the error-handling module 113 can, as an example, implement a different and enhanced technique for recovering the data or correctly decoding the codeword. For example, the error-handling module 113 can implement a recovery process in response to a failure to decode the codeword using RAIN parity. As another example, the error-handling module 113 can also or alternatively implement a soft RAIN recovery decoding process. As described herein, soft RAIN recovery can implement the soft decoding process described above using the parity bits encoded to form the syndrome vector, as well as the bit-wise RAIN parity bits, to detect and correct codewords. The soft RAIN recovery decoding process does not require an additional read of the NAND memory device, but can instead implement the existing soft bit information that was ascertained for the standard soft decoding algorithm. Similar to a standard soft decoding process, the soft RAIN recovery decoding process can implement an LLR set for providing weighted parity checks of check nodes in an iterative manner that rewards and penalizes LLR values based on the results of the parity checks that each include a respective one of the RAIN parity bits. However, as described herein, the error-handling module 113 can implement a plurality of different LLR sets in the soft RAIN recovery process, such as to accommodate a codewords having a higher HRER.

For example, the error-handling module 113 can implement a first soft RAIN recovery decoding process in response to a failure to decode the codeword via the standard LDPC decoding process and/or RAIN recovery, in which the first soft RAIN recovery implements a first LLR set. The first LLR set can, as an example, be optimized for decoding an average HRER to serve a broad set of codewords. As an example, the first LLR set can be the same LLR set implemented in the standard LDPC decoding process, and can correspond to the LLR set of Table 1. In response to a determination that the first soft RAIN recovery decoding process fails, the error-handling module 113 can then implement a second soft RAIN recovery decoding process, in which the second soft RAIN recovery implements a second LLR set. The second LLR set can, as an example, be optimized for decoding codewords having higher HRER values than the first LLR set. Table 2 provides an example of a second LLR set (relative to the LLR set demonstrated in Table 1 that can correspond to a first LLR set) that correlates a soft read (1H2S) bit value and reliability with a particular LLR value.

TABLE 2

| Bit Value | Reliability | LLR Value |
| --- | --- | --- |
| 1 | High | −7 |
| 1 | Medium | −5 |
| 1 | Low | −3 |
| 0 | Low | 3 |
| 0 | Medium | 5 |
| 0 | High | 7 |

The LLR values of the second LLR set demonstrated in Table 2 can, for example, be optimized for decoding codewords having higher HRER values (e.g., relative to a first LLR set). Table 2 is demonstrated by example only, such that any given LLR set implemented for LDPC decoding and/or soft RAIN recovery decoding (e.g., including the first and second LLR sets demonstrated respectively in Tables 2 and 3) can be defined as having any of a variety of values.

Therefore, as described herein, implementing a plurality of soft RAIN recovery decoding processes with different respective LLR sets can provide an additional data recovery process beyond a standard LDPC decoding process and/or RAIN recovery, and can provide a more robust data error correction solution than a conventional soft RAIN recovery process. As one example, the error-handling module 113 can continue implementing subsequent soft RAIN recovery decoding processes, each implementing different LLR sets, in response to subsequent failures. Therefore, the error-handling module 113 is not limited to two soft RAIN recovery decoding processes. As another example, the error-handling module 113 can implement a predefined number of soft RAIN recovery decoding processes and, in response to repeated failures to decode the codeword, can time-out and mark the codeword as uncorrectable.

In examples where the codework is successfully corrected by the decoding operation of the error-handling module 113, the corrected codeword is stored in the local memory 119. Additionally, in some examples, the memory sub-system controller 115 can extract embedded data (e.g., remove parity bits) from the corrected codeword, and output the embedded data to the host system 120, such as in a return operation in response to a read memory request provided by the host system 120. In other examples, the entire codeword (including the parity bits) is output to the host system 120.

Figure 1B:
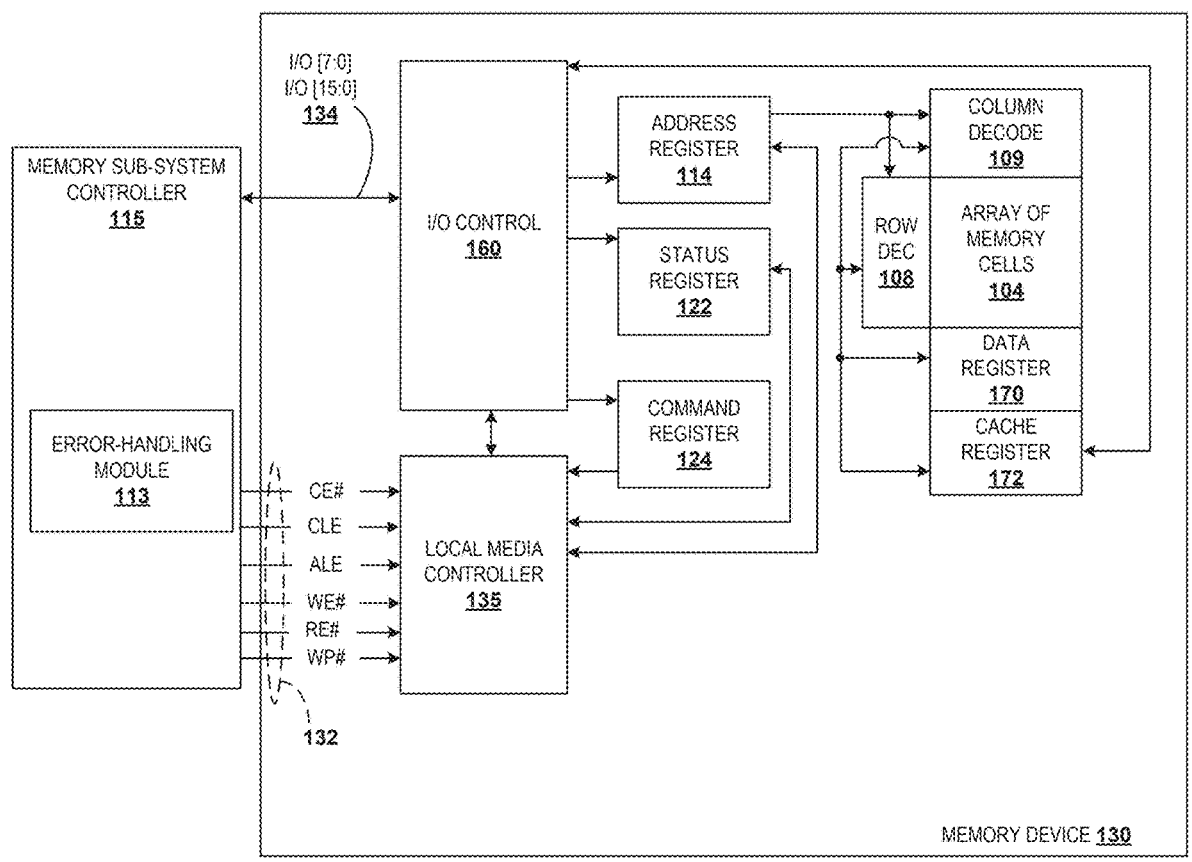
FIG. 1B illustrates a simplified block diagram of an example memory device in communication with a memory sub-system controller.

FIG. 1B illustrates a simplified block diagram of an example of a first apparatus, in the form of a memory device 130, in communication with an example of a second apparatus, in the form of a memory sub-system controller 115 of a memory sub-system (e.g., the memory sub-system 110 of FIG. 1A). Some examples of electronic systems include personal computers, personal digital assistants (PDAs), digital cameras, digital media players, digital recorders, games, appliances, vehicles, wireless devices, mobile telephones, etc. The memory sub-system controller 115 (e.g., a controller external to the memory device 130), can be a memory controller or other external host device.

The memory device 130 includes an array of memory cells 104 logically arranged in rows and columns. The memory cells 104 form a non-transitory computer-readable medium. Memory cells of a logical row are connected to the same access line (e.g., a wordline) while memory cells of a logical column are selectively connected to the same data line (e.g., a bit line) in some examples. In some examples, a single access line is associated with more than one logical row of memory cells and a single data line may be associated with more than one logical column. Memory cells (not shown in FIG. 1B) of at least a portion of the array of memory cells 104 are capable of being programmed to one of at least two target data states.

The memory device 130 includes row decode circuitry 108 and column decode circuitry 109 for decoding address signals. Address signals are received and decoded to access an array of memory cells 104 of the memory device 130. The memory device 130 also includes input/output (I/O) control circuitry 160 to manage input of commands, addresses and data to the memory device 130 as well as output of data and status information from the memory device 130. The memory device 130 has an address register 114 and is in communication with the I/O control circuitry 160, the row decode circuitry 108 and the column decode circuitry 109 to latch the address signals prior to decoding. The memory device 130 also includes a command register 124 in communication with the I/O control circuitry 160 and a local media controller 135 (e.g., the local media controller 135 of FIG. 1A) to latch incoming commands.

A controller (e.g., the local media controller 135 internal to the memory device 130) controls access to the array of memory cells 104 in response to the commands and generates status information for the external memory sub-system controller 115. For example, the local media controller 135 is configured to perform access operations (e.g., read operations, programming operations and/or erase operations) on the array of memory cells 104. The local media controller 135 is in communication with the row decode circuitry 108 and the column decode circuitry 109 to control the row decode circuitry 108 and the column decode circuitry 109 in response to the addresses.

As described above in the example of FIG. 1A, the error-handling module 113 can implement soft decoding processes to decode codewords corresponding to the data stored in the memory device 130 (e.g., the array of memory cells 104). As described herein, the error handling module 113 can first attempt to decode a codeword with a standard soft decoding process (e.g., standard LDPC decoding process). In response to failure of the standard soft decoding process to decode the codeword, the error-handling module 113 can switch to a soft RAIN recovery decoding process to decode the codeword. For example, as described herein, the error-handling module 113 can implement a plurality of soft RAIN recovery decoding processes with different respective LLR sets can provide an additional data recovery process beyond a standard LDPC decoding process to provide a more robust data error correction solution than a conventional soft RAIN recovery process.

The local media controller 135 is also in communication with a cache register 172. The cache register 172 latches data, either incoming or outgoing, as directed by the local media controller 135 to temporarily store data while the array of memory cells 104 is busy writing or reading, respectively, other data. During a program operation (e.g., write operation), data is passable from the cache register 172 to the data register 170 for transfer to the array of memory cells 104, and new data can be latched in the cache register 172 from the I/O control circuitry 160. During a read operation, data is passable from the cache register 172 to the I/O control circuitry 160 for output to the memory sub-system controller 115. New data is passable from the data register 170 to the cache register 172. The cache register 172 and/or the data register 170 form (e.g., or form a portion of) a page buffer of the memory device 130. The page buffer includes sensing devices (not shown in FIG. 1B) to sense a data state of a memory cell of the array of memory cells 104. For example, the sensing devices sense a state of a data line connected to that memory cell. The memory device 130 also includes a status register 122 in communication with the I/O control circuitry 160 and the local media controller 135 to latch the status information for output to the memory sub-system controller 115.

The memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE # and/or a write protect signal WP #. Additional or alternative control signals (not shown) can be further received over control link 132 depending upon the nature of the memory device 130. In some examples, the memory device 130 receives command signals (which represent commands), address signals (which represent addresses) and data signals (which represent data) from the memory sub-system controller 115 over a multiplexed input/output (I/O) bus 134 and outputs data to the memory sub-system controller 115 over the I/O bus 134.

In some examples, the commands are received over input/output (I/O) pins [7:0] of the I/O bus 134 at I/O control circuitry 160 and may then be written into the command register 124. The addresses are received over input/output (I/O) pins [7:0] of the I/O bus 134 at I/O control circuitry 160 and written into the address register 114. The data is receivable over input/output (I/O) pins [7:0] for an 8-bit device or input/output (I/O) pins [15:0] for a 16-bit device at I/O control circuitry 160 and is writable into the cache register 172. The data is subsequently written into the data register 170 for programming the array of memory cells 104 in some examples.

In some examples, the cache register 172 is omitted, and in such examples, the data is written directly into the data register 170. Additionally or alternatively, data is output over input/output (I/O) pins [7:0] for an 8-bit device or input/output (I/O) pins [15:0] for a 16-bit device. Moreover, it is noted that although reference is made to I/O pins, in other examples, a different conductive node providing for electrical connection to the memory device 130 by an external device (e.g., the memory sub-system controller 115), such as conductive pads or conductive bumps could be used in addition to or as a replacement for the I/O pins.

The example memory device 130 of FIG. 1B has been simplified. Moreover, in other examples, the functionality of the various block components described with reference to FIG. 1B are not segregated to distinct components or component portions of an integrated circuit device. For example, a single component or component portion of an integrated circuit device could be adapted to perform the functionality of more than one block component of FIG. 1B. Alternatively, components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) are useable in various examples.

Figure 2:
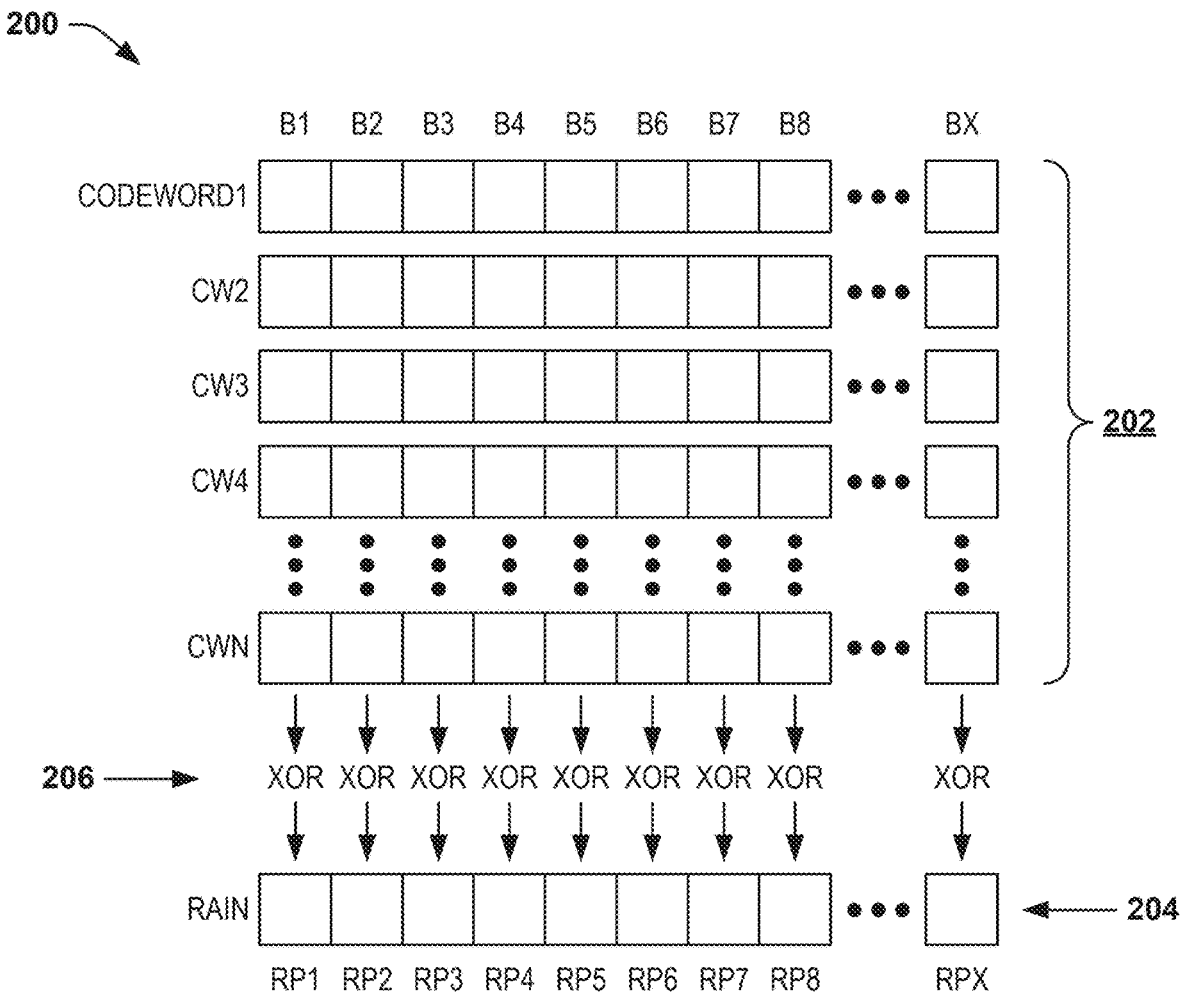
FIG. 2 illustrates an example set of codewords and RAIN parity bits.

FIG. 2 illustrates an example diagram 200 of a set of codewords and RAIN parity bits. The codewords are demonstrated generally at 202 and as having a quantity N ("CODEWORD1" through "CODEWORDN"). Each of the codewords 202 is demonstrated as having a length X corresponding to a quantity of bits, demonstrated in the example of FIG. 2 as being blank (e.g., including a hard bit binary value "0" or "1") and labeled "B1" through "BX". Each of the codewords 202 can include a set of parity bits that can be implemented for LDPC decoding. As described above, each of the bits of the codewords 202 can be assigned reliability values based on an LLR set (e.g., one of the LLR sets demonstrated above in the examples of Table 1 or Table 2).

The diagram 200 demonstrates a set of RAIN parity bits at 204, demonstrated as having a length X corresponding to a quantity of bits ("RP1" through "RPX"). The RAIN parity bits 204 can each correspond to a bit-wise XOR logic operation of the bit-wise RAIN stripes of each of the codewords 202, demonstrated generally at 206. In other words, the first bit B1 of each of the codewords 202 is provided in an XOR logic operation to generate the first RAIN parity bit RP1, the second bit B2 of each of the codewords 202 is provided in an XOR logic operation to generate the second RAIN parity bit RP2, etc. As described herein, the error-handling controller 113 can implement the RAIN parity bits 204 in a RAIN recovery process to recover lost data (e.g., in response to device failure and/or errors). As also described herein, the RAIN parity bits 204 can each be implemented as an additional parity bit in one or more soft RAIN recovery decoding processes in response to failure of the standard LDPC decoding process and/or the RAIN recovery process. For example, each of the RAIN parity bits 204 can be implemented as an additional parity bit for parity checks in a first soft RAIN LDPC decoding process that uses a first LLR set (e.g., optimized for a broad range of codewords) and in a second soft RAIN LDPC decoding process that uses a second LLR set (e.g., optimized for high HRER codewords).

Figure 3:
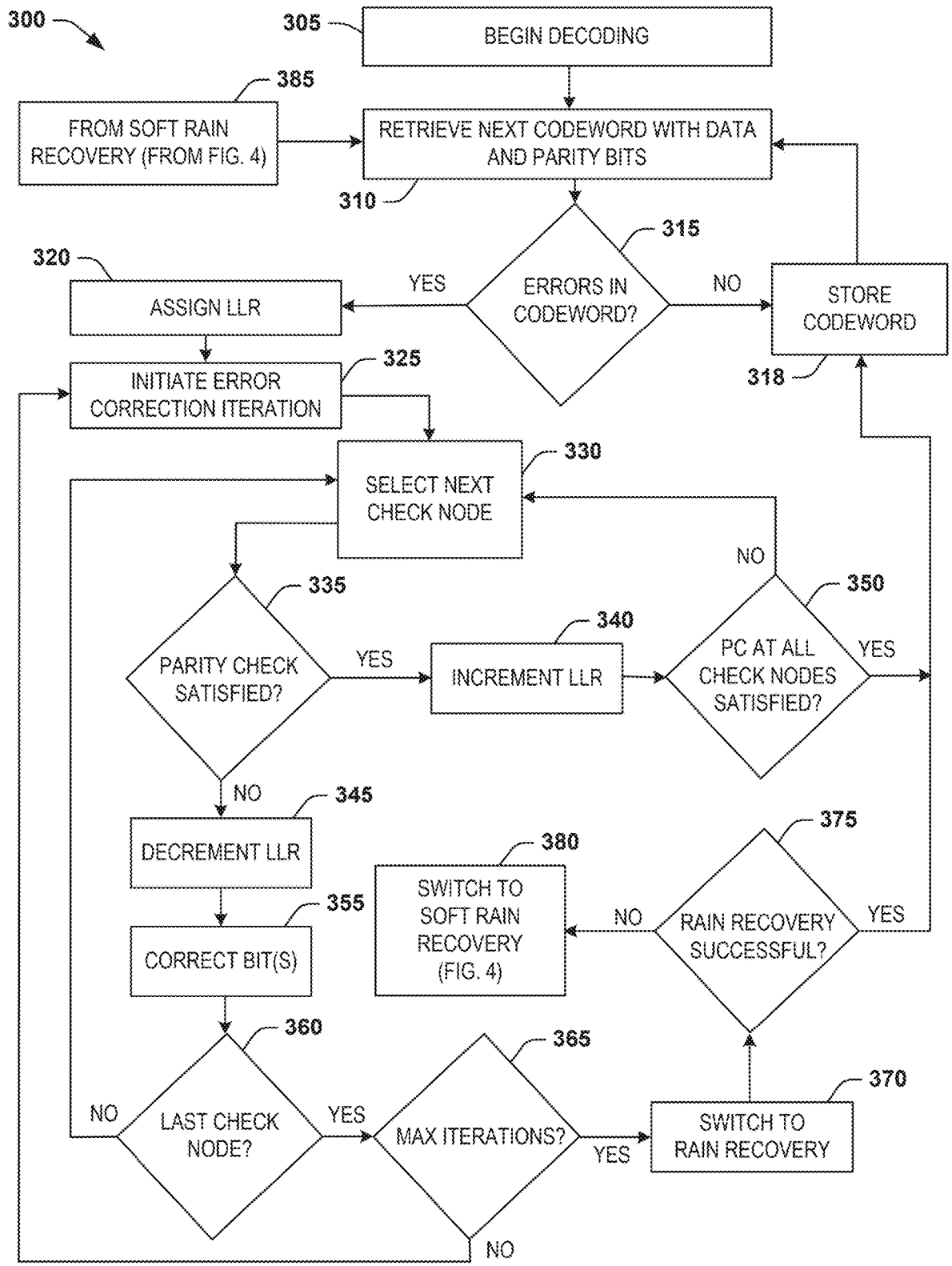
FIG. 3 illustrates a flowchart of an example method for decoding data.

FIG. 3 illustrates a flowchart of an example method 300 for decoding data. The method 300 can be implemented, for example, by a controller, such as the memory sub-system controller 115 of the system 100 of FIG. 1A. The method 300 can thus correspond to a standard LDPC decoding process. The method 300 begins at block 305, in which the controller LDPC decoding process begins. At block 310 the controller retrieves a next codeword that includes both data and parity bits. The next codeword can correspond to a next codeword in a sequence of codewords (e.g., starting with CODE-WORD1 and continuing in sequence to CODEWORDN in the example of FIG. 2) and is typically output from a communication channel or retrieved from a storage device, where the codeword has been previously encoded with LDPC codes that include parity bits for error detection and correction. The bits of the codeword have a reliability (e.g., low, medium or high).

In block 315, an error-handling module (e.g., the error-handling module 113 of FIG. 1A) of the controller determines whether there are errors in the codeword. To make this determination, the error-handling module multiplies the codeword with a transverse of an H matrix of the LDPC code to provide a syndrome vector. This operation can also be performed without making a matrix multiplication by sequentially checking each parity using XOR operations. If the syndrome vector is all-zero (e.eg, syndrome weight=0), there are no errors in the codeword. If the syndrome vector is non-zero, there is at least one error in the codeword, and the non-zero value of the syndrome vector is employable to identify check nodes that have failed parity checks. If the determination at block 315 is negative (e.g., NO), the method 300 proceeds to block 318. If the determination at block 315 is positive (e.g., YES), the method 300 proceeds to block 320.

At block 318 (reached when no errors are present in the codeword), the codeword is stored in a local memory (e.g., the local memory 119) of the controller. The data extracted from the codeword can be output to an external system, such as a host (e.g., the host system 120 of FIG. 1A). For instance, in some such examples, in response to detecting that no errors are present in the codeword, the parity bits are removed from the codeword, and the remaining data is provided to the external system, such as in a return operation in response to a read memory request. After the codeword is stored at block 318, the method 300 proceeds back to 310 for retrieval of the next codeword.

At block 320 (reached when error(s) are detected in the codeword), the error-handling module assigns LLR values from an LLR set to each bit of the codeword to provide a codeword LLR. The LLR set can be formed of integers corresponding to reliability of bits in the codeword (e.g., as demonstrated in Table 1). At block 325, the error-handling module initiates an error correction iteration of the LDPC decoding algorithm (e.g., that employs a MinSum decoder), and thus increments a number of executed iterations of the LDPC decoding algorithm. For the first iteration of the LDPC decoding algorithm, the error-handling module implements the codeword LLR as an initiation parameter of the LDPC decoding process. At block 330, a next check node is selected for a parity check. For example, the decoding process can calculate two minimum values, min1 and min2 (where min2>min1) for the selected parity check node. In some examples, scalar and offsets are applied to min1 and min2.

At block 335, the error-handling module determines whether the parity check of the selected check node is satisfied. If the determination at block 335 is positive (e.g., YES), the method 300 proceeds to block 340. If the determination at block 335 is negative (e.g., NO), the method 300 proceeds to block 345.

At block 340 (reached if the parity check at block 335 for the selected node is satisfied), the LLR value for each variable node connected to the selected check node is incremented (rewarded) by the error correcting module. For example, the LDPC decoding process can increment the variable node with a lowest LLR value by min2, and can increment the remaining variable node(s) by min1. At block 350, the error-handling module determines whether the parity check (PC) of all check nodes is satisfied. If the determination at block 350 is positive (e.g., YES), then no errors remain in the codeword, and the method 300 proceeds to block 318. If the determination at block 350 is negative (e.g., NO), the method 300 proceeds to block 330. At block 330, a next check node is selected by the error-handling module and the method 300 returns to block 335.

At block 345 (reached if the parity check at block 335 for the selected check node fails), the error correcting module decrements (penalizes) the LLR value for each variable node connected to the selected check node. The decoding process can decrement the variable node with a lowest LLR value by min2, and can decrement the remaining variable node(s) by min1. At block 355, the bit(s) of the variable node are flipped if the decrementing of the LLR value at block 345 changes a sign of bit(s) at a variable node. The method 300 then proceeds to block 360. At block 360, the error-handling module determines whether the parity check provided at block 335 was provided on the last check node of the current iteration of the LDPC decoding process. If the determination at block 360 is positive (e.g., YES), the method 300 proceeds to block 365. If the determination at block 360 is negative (e.g., NO), the method 300 returns to block 330, at which a next check node is selected by the error-handling module and the method 300 proceeds to a parity check of the next check node at block 335.

At block 365 (reached if the error-handling module determines that the parity check provided at block 335 was for the last check node of the current iteration), the error-handling module determines whether a maximum number of iterations of the decoding process has been reached. If the determination at block 365 is negative (e.g., NO), the method 300 returns to block 325, at which the error-handling module increments a number of executed iterations and begins another iteration of the LDPC decoding algorithm.

If the determination at block 365 is positive (e.g., YES), at which the maximum number of iterations of the decoding process has been reached, the method 300 proceeds to block 370. At block 370, the error-handling module switches to a RAIN recovery process and proceeds to block 375. For example, the error-handling module can evaluate the RAIN parity bits (e.g., the RAIN parity bits RP1 through RPX) to determine if an error in the codeword can be detected/recovered. At block 375, the error-handling module makes a determination as to whether the RAIN recovery process is successful. If the determination at block 375 is positive (e.g., YES), then no errors remain in the codeword, and the method 300 proceeds to block 318. If the determination at block 375 is negative (e.g., NO), the method 300 proceeds to block 380. At block 380, the error-handling module switches to a soft RAIN recovery decoding process, demonstrated in the example of FIG. 4.

In the example of FIG. 3, the block 370 in which the error-handling controller switches to the RAIN recovery process can be omitted in some examples. For example, in response to a determination that the maximum number of iterations of the decoding process has been reached, the method 300 can instead proceed directly to block 380 from block 365. Therefore, the error-handling module can switch to the soft RAIN recovery decoding process, demonstrated in the example of FIG. 4, in response to failure of the error-handling module to decode the respective codeword using the standard LDPC decoding process.

Figure 4:
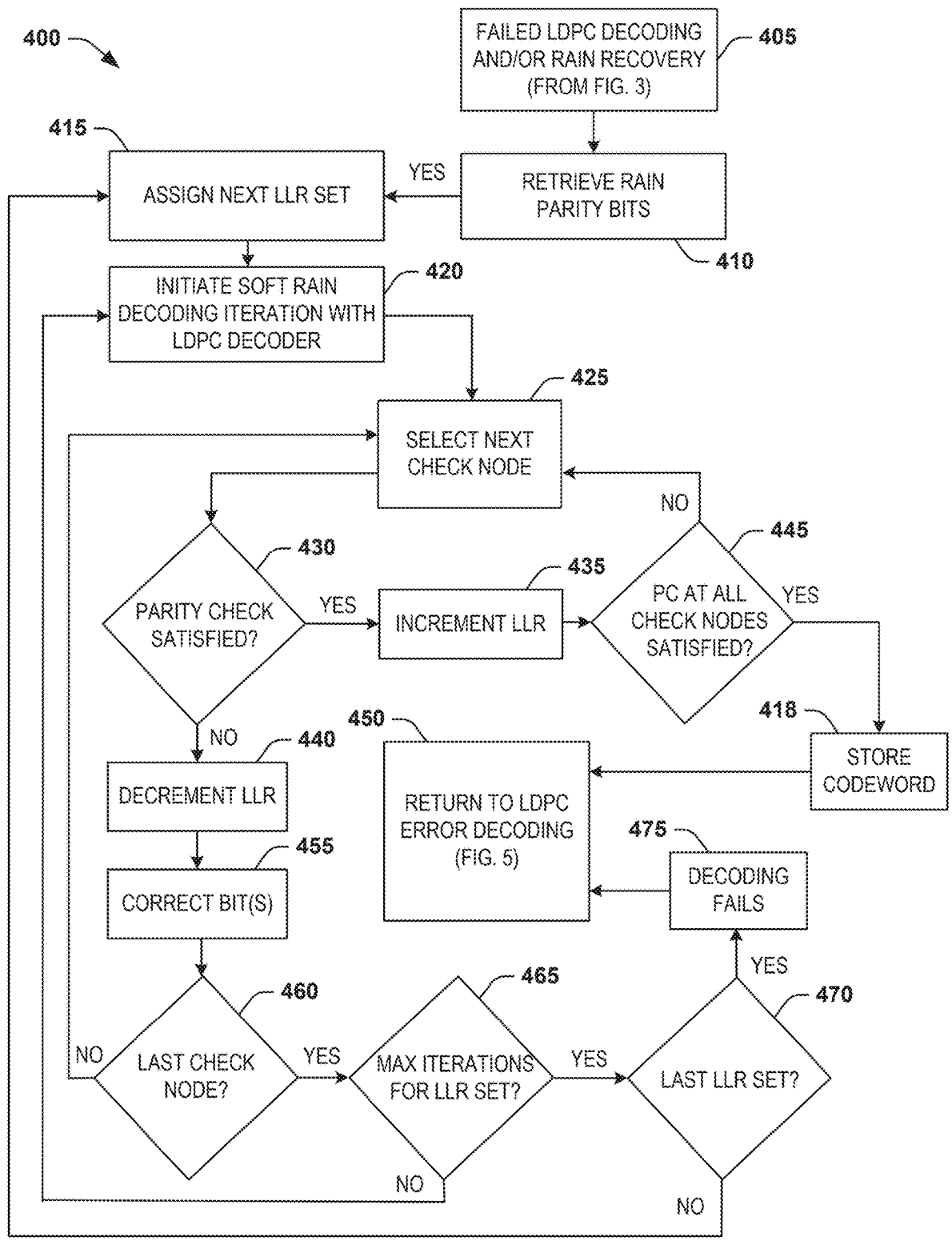
FIG. 4 illustrates a flowchart of an example method for decoding data via a soft RAIN recovery decoding process.

FIG. 4 illustrates a flowchart of an example method 400 for decoding data via a soft RAIN recovery decoding process. The method 400 can be implemented, for example, by a controller, such as the memory sub-system controller 115 of the system 100 of FIG. 1A. The method 400 begins at block 405, at which the standard LDPC decoding process and/or RAIN recovery process from FIG. 3 failed, which occurs when the original codeword decode process fails, resulting in a RAIN recovery process which likewise in response to another failure on the RAIN stripe of N codewords other than the original codeword, as demonstrated in the example of FIG. 2. Thus, at the block 405, the soft RAIN recovery decoding process begins as a result of two or more codewords on the RAIN stripe that cannot be corrected using LDPC parity bits alone.

At block 410 the controller retrieves the RAIN parity bits (e.g., the RAIN parity bits RP1 through RPX) for use in soft RAIN recovery decoding. The RAIN parity bits can be retrieved from a storage device, such as including the other parity bits for error detection and correction. As an example, the RAIN parity bits can result from an XOR of all the codewords on the RAIN stripe. To provide the XOR of all the codewords on the RAIN stripe, the controller uses the corrected codewords parity computation and the data read from the memory for the codewords that cannot be corrected using LDPC parity bits. Comparing the RAIN parity with the computed XOR operation demonstrates which RAIN parity bits are satisfied (passed) and which parity bits are not satisfied (failed).

At block 415, the error-handling module assigns a next LLR set. The next LLR set can be a first LLR set if the method 400 arrives at block 415 from block 410. At block 415, LLR values from the next LLR set (e.g., a first LLR set) are assigned to each bit of the codeword to provide a codeword LLR. As an example, the first LLR set can be the same as the LLR set assigned in the standard LDPC decoding process (e.g., as demonstrated in Table 1 and at block 320 in the example of FIG. 3), and can correspond to an LLR set that is optimized for a broad range of codewords. As an example, for a given LDPC codeword, the main difference between the LDPC decoding in the method 300 of the example of FIG. 3 and the method 400 of the example of FIG. 4 is the input LLR set. In the method 300 of the example of FIG. 3, the input LLR set provided at block 320 is based on a NAND soft read, such as 1H2S. In the method 400 in the example of FIG. 4, the input LLR set provided at block 415 is based on a NAND soft read, such as 1H2S, and whether the bit-level RAIN parity is satisfied or not satisfied.

At block 420, the error-handling module initiates an iteration of a soft RAIN recovery decoding process using the LDPC decoding algorithm (e.g., that employs a MinSum decoder), and thus increments a number of executed iterations of the soft RAIN LDPC decoding algorithm. For the first iteration of the soft RAIN LDPC decoding algorithm, the error-handling module implements the LLR set assigned at block 415 as an initiation parameter of the LDPC decoding process. At block 425, a next check node is selected for a parity check. In the soft RAIN recovery decoding process of the method 400, each parity check also includes the respective RAIN parity bit for the parity check of the respective one of the bits of the codeword. If the method 400 arrives at block 425 from block 420, the next check node is a first check node.

At block 430, the error-handling module determines whether the parity check of the selected check node is satisfied. If the determination at block 430 is positive (e.g., YES), the method 400 proceeds to block 435. If the determination at block 430 is negative (e.g., NO), the method 400 proceeds to block 440. As described below, block 435 rewards bit-level LLR values and block 440 penalizes bit-level LLR values from the initial LLR values assigned at block 415.

At block 435 (reached if the parity check at block 435 for the selected node is satisfied), the LLR value for each variable node connected to the selected check node is incremented (rewarded) by the error correcting module. For example, the LDPC decoding process can increment the variable node with a lowest LLR value by min2, and can increment the remaining variable node(s) by min1. As an example, if a bit level LLR value for a bit of the codeword is read to be 10 (e.g., based on Table 1), if the corresponding RAIN parity bit is satisfied, the LLR value 10 can be increased (e.g., to an LLR value 12). Therefore, the RAIN parity provides another soft bit to the LDPC decoder operation in addition to what was read from the NAND, resulting in significantly higher correction capability.

At block 445, the error-handling module determines whether the parity check (PC) of all check nodes is satisfied. If the determination at block 445 is positive (e.g., YES), then no errors remain in the codeword, and the method 400 proceeds to block 418. If the determination at block 445 is negative (e.g., NO), the method 400 proceeds to block 425. At block 430, the next check node is selected by the error-handling module and the method 400 returns to block 435.

At block 418 (reached when there are no longer errors present in the codeword), the codeword is stored in a local memory (e.g., the local memory 119) of the controller. The data extracted from the codeword can be output to an external system, such as a host (e.g., the host system 120 of FIG. 1A). For instance, in some such examples, in response to detecting that no errors are present in the codeword, the parity bits are removed from the codeword, and the remaining data is provided to the external system, such as in a return operation in response to a read memory request. After the codeword is stored at block 418, the method 400 proceeds to block 450.

At block 450, the error-handling module switches from the soft RAIN recovery decoding process of the example of FIG. 4 back to the standard LDPC decoding process of the example of FIG. 3. Referring back to the example of FIG. 3, the return from the soft RAIN recovery decoding process is demonstrated at block 385. Block 385 thus corresponds to another beginning of the standard LDPC decoding process, along with block 305. Therefore, the method 300 proceeds from block 385 to block 310, at which a next codeword is retrieved, along with the respective data and parity bits. Accordingly, the next codeword is decoded by the standard LDPC decoding process as described above in the example of FIG. 3.

Referring back to the example of FIG. 4, at block 440 (reached if the parity check at block 430 for the selected check node fails), the error correcting module decrements (penalizes) the LLR value for each variable node connected to the selected check node. The decoding process can decrement the variable node with a lowest LLR value by min2, and can decrement the remaining variable node(s) by min1. If the corresponding RAIN parity bit is not satisfied, the LLR value 10 can be decreased (e.g., to an LLR value 8). Similarly, other LLR values of Table 1 can be adjusted at block 415 based on whether bit level RAIN parity is satisfied or not. Therefore, as described above, the RAIN parity provides another soft bit to the LDPC decoder operation in addition to what was read from the NAND, resulting in significantly higher correction capability.

At block 455, the bit(s) of the variable node are flipped if the decrementing of the LLR value at block 450 changes a sign of bit(s) at a variable node. The method 400 then proceeds to block 460. At block 460, the error-handling module determines whether the parity check provided at block 430 was provided on the last check node of the current iteration of the LDPC decoding process. If the determination at block 460 is positive (e.g., YES), the method 400 proceeds to block 465. If the determination at block 460 is negative (e.g., NO), the method 400 returns to block 430, at which a next check node is selected by the error-handling module and the method 300 proceeds to a parity check of the next check node at block 430.

At block 465, the error-handling module makes a determination as to whether a maximum number of iterations of the soft RAIN decoding process has been reached for the given LLR set that was assigned at block 415. If the determination at block 465 is negative (e.g., NO), the method 400 returns to block 420, at which the error-handling module increments a number of executed iterations and begins another iteration of the soft RAIN LDPC decoding algorithm.

If the determination at block 465 is positive (e.g., YES), then the current soft RAIN recovery decoding process has failed to decode the codeword with the LLR set that was assigned at block 415. The method 400 then proceeds to block 470. At block 470, the error-handling module makes a determination as to whether the LLR set assigned at block 415 is a last LLR set of a predefined quantity of LLR sets implemented for each of separate respective soft RAIN recovery decoding processes. As an example, the error-handling module can implement one of a plurality of predefined LLR sets in each of a respective plurality of soft RAIN recovery decoding processes that can be provided for a codeword in response to repeated failure to decode the data therein.

If the determination at block 470 is negative (e.g., NO), then the LLR set that was assigned at block 415 was either the first LLR set or the error-handling module has not yet exhausted all LLR sets in decoding the codeword via the soft RAIN recovery decoding process. The method 400 thus proceeds back to block 415 at which the error-handling module assigns the next LLR set (e.g., the second LLR set). As an example, the next LLR set can be optimized for a different or more specific range of codewords (e.g., having higher HRER values). The error-handling module can then proceed to block 420 to initiate another (next) iteration of the soft RAIN recovery error decoding operation with the LDPC decoder using the next (e.g., second) LLR set.

If the determination at block 470 is positive (e.g., YES), then the LLR set that was assigned at block 415 was the last of the predefined LLR sets implemented for respective soft RAIN recovery decoding processes. The method 400 thus proceeds to block 475. At block 475, the decoding of the codeword fails, and the error-handling module deems the respective codeword uncorrectable. The method 400 thus proceeds to block 450, at which the error-handling module switches from the soft RAIN recovery decoding process of the example of FIG. 4 back to the standard LDPC decoding process of the example of FIG. 3. The method 400 thus proceeds from block 385 in the method 300 to block 310, at which a next codeword is retrieved, along with the respective data and parity bits. Accordingly, the next codeword is decoded by the standard LDPC decoding process as described above in the example of FIG. 3.

The examples of FIGS. 3 and 4 thus demonstrate the manner in which the error-handling module provides a robust manner of decoding codewords. Particularly, the soft RAIN recovery decoding process demonstrated in the example of FIG. 4, in which multiple LLR sets are implemented in one or more soft RAIN LDPC decoding processes can provide for decoding a very broad range of codewords, including codewords that have a higher HRER. As a result, the error-handling module can exhibit an additional read window budget (RWB) gain over conventional error-correcting algorithms, including conventional soft RAIN recovery algorithms.

Figure 5:
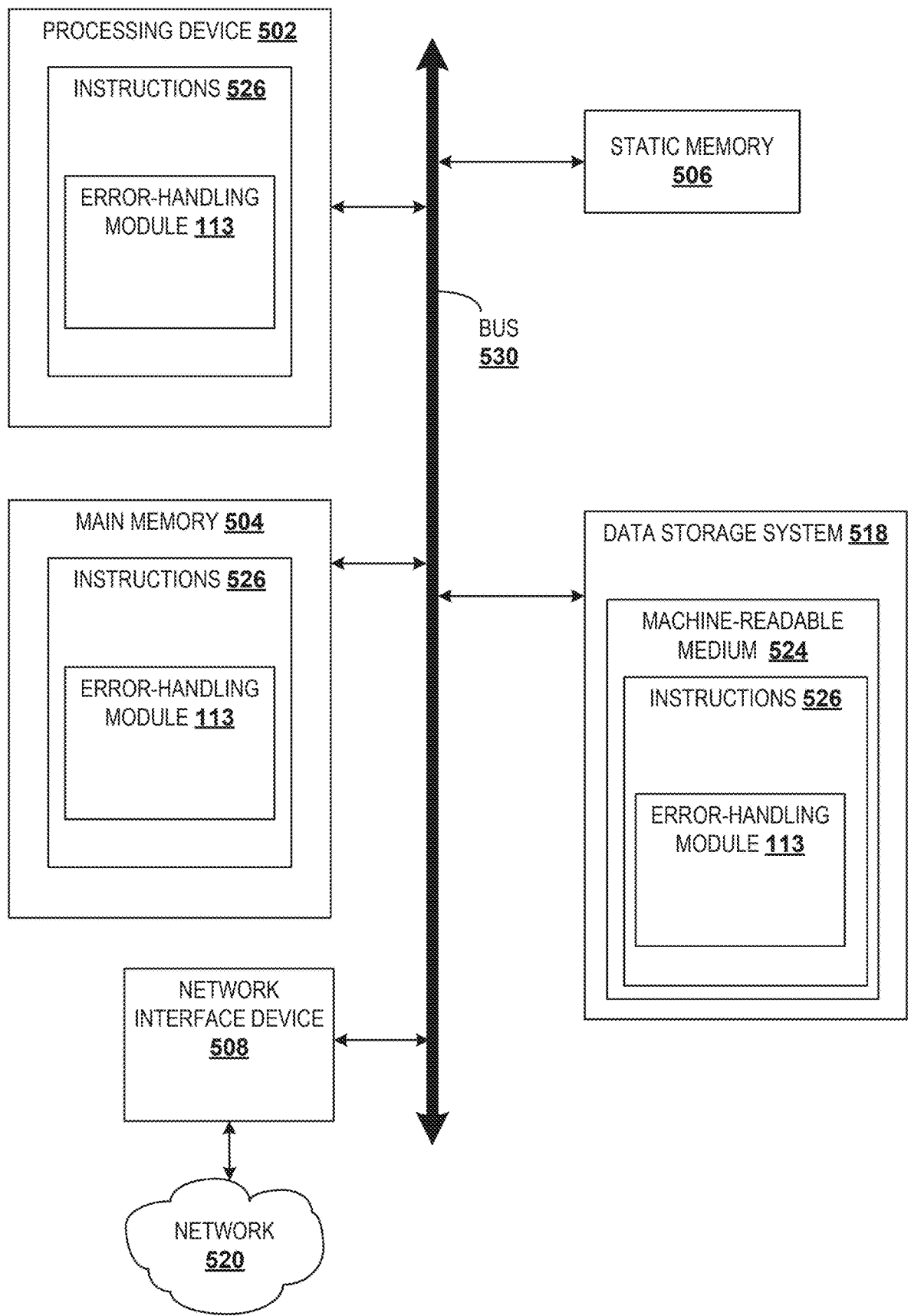
FIG. 5 illustrates an example of a computer system in which examples of the present description may operate.

FIG. 5 illustrates an example machine of a computer system 500 (a machine) within which a set of instructions, for causing the machine to perform any one or more of the methodologies discussed herein, can be executed. In some examples, the computer system 500 corresponds to a host system (e.g., the host system 120 of FIG. 1A) that includes, is coupled to, or utilizes a memory sub-system (e.g., the memory sub-system 110 of FIG. 1A) or is used to perform the operations of a controller (e.g., to execute an operating system to perform operations corresponding to the error-handling module 113 of FIG. 1A). In other examples, the machine is connected (e.g., networked) to other machines in a LAN, an intranet, an extranet and/or the Internet. In various examples, the machine operates in the capacity of a server or a client machine in client-server network environment, as a peer machine in a peer-to-peer (or distributed) network environment or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge or any machine capable of executing a set of instructions (sequential or otherwise) that specify actions to be taken by that machine. In other embodiments, the machine may be a computer within an automotive application, a data center, a smart factory, or other industrial application. Further, while a single machine is illustrated, the term "machine" shall also be taken to include any collection of machines that individually or jointly execute a set (or multiple sets) of instructions to perform the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM) or other non-transitory computer-readable media) and a data storage system 518, which communicate with each other via a bus 530.

The processing device 502 represents one or more general-purpose processing devices such as a microprocessor, a central processing unit, etc. More particularly, the processing device 502 can be a complex instruction set computing (CISC) microprocessor, reduced instruction set computing (RISC) microprocessor, very long instruction word (VLIW) microprocessor or a processor implementing other instruction sets or processors implementing a combination of instruction sets. In some examples, the processing device 502 is implemented with a special-purpose processing devices such as an application specific integrated circuit (ASIC), a field programmable gate array (FPGA), a digital signal processor (DSP), network processor, etc. The processing device 502 is configured to execute instructions 526 for performing the operations discussed herein. In some examples, the computer system 500 includes a network interface device 508 to communicate over the network 520.

The data storage system 518 includes a machine-readable storage medium 524 (also known as a computer-readable medium) that store sets of instructions 526 or software for executing the methodologies and/or functions described herein. The machine-readable storage medium 524 is a non-transitory medium. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518 and/or main memory 504 can correspond to the memory sub-system 110 of FIG. 1A. Accordingly, the machine-readable storage medium 524, the data storage system 518 and/or the main memory 504 are examples of non-transitory computer-readable media.

In some examples, the instructions 526 include instructions to implement functionality corresponding to the error-handling module 113 of FIG. 1A. As an example, the instructions 526 can include implementing multiple soft RAIN decoding processes with different respective LLR sets to decode codewords. While the machine-readable storage medium 524 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared and otherwise manipulated. It has proven convenient at times, principally for reasons of common usage, to refer to these signals as bits, values, elements, symbols, characters, terms, numbers, etc.

It is noted, however, that all of these and similar terms are to be associated with the appropriate physical quantities and are merely convenient labels applied to these quantities. This description can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

This description also relates to an apparatus for performing the operations herein. This apparatus can be specially constructed for the intended purposes or this apparatus can include a general purpose computer selectively activated or reconfigured by a computer program stored in the computer. Such a computer program can be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards or any type of media suitable for storing electronic instructions, each coupled to a computer system bus.

The algorithms and displays presented herein are not inherently related to any particular computer or other apparatus. Various general purpose systems can be used with programs in accordance with the descriptions herein, or it can prove convenient to construct a more specialized apparatus to perform the method. In addition, the present disclosure is not described with reference to any particular programming language. It will be appreciated that a variety of programming languages can be used to implement the teachings of the disclosure as described herein.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means "based at least in part on". Additionally, where the disclosure or claims recite "a," "an," "a first" or "another" element, or the equivalent thereof, it should be interpreted to include one or more than one such element, neither requiring nor excluding two or more such elements.

What is claimed is:

1. A method for decoding data, comprising:
  determining by an error-handling module of a controller, that a codeword received from a memory device has errors;
  decoding embedded data from the codeword via a soft decoding process based on assigning respective log-likelihood ratio (LLR) values of a first LLR set to bits of the codeword by the controller;
  accessing a set of bit-wise redundant array of independent NAND (RAIN) parity bits from the memory device or another memory device by the controller in response to determining failure of the soft decoding process;
  decoding the embedded data from the codeword via a first soft RAIN decoding process based on respective LLR values of a second LLR set assigned to the bits of the codeword and the RAIN parity bits by the controller; and
  decoding the embedded data from the codeword via a second soft RAIN decoding process based on respective LLR values of a third LLR set assigned to the bits of the codeword and the RAIN parity bits by the controller in response to determining failure of the first soft RAIN decoding process.

2. The method of claim 1, wherein the second LLR set has at least one different LLR value relative to the third LLR set.

3. The method of claim 2, wherein LLR values of the first, second, and third LLR sets are integers, wherein decoding comprises iteratively rewarding or penalizing LLR values of the respective one of the first, second, and third LLR sets based on parity check outcomes.

4. The method of claim 1, wherein the first LLR set and the second LLR set have equal LLR values.

5. The method of claim 1, further comprising providing a RAIN recovery procedure via the RAIN parity bits in response to determining failure of the soft decoding process, wherein decoding the embedded data from the codeword via the first soft RAIN decoding process comprises decoding the embedded data from the codeword via the first soft RAIN decoding process in response to failure of the RAIN recovery procedure.

6. The method of claim 1, wherein the LLRs are updated using a MinSum decoding process in each of the soft decoding process, the first soft RAIN decoding process, and the second soft RAIN decoding process.

7. The method of claim 1, wherein at least one of the first and second LLR sets are based on a first range of high reliability error rate (HRER) of the memory device, and wherein the third LLR set is based on a second range of HRER of the memory device different from the first range of HRER.

8. The method of claim 7, wherein HRER values of at least a portion of the second range of HRER of the memory device are greater than HRER values of the first range of HRER of the memory device.

9. The method of claim 1, further comprising:
  detecting that the errors of the codeword have been corrected one of the soft decoding process, the first soft RAIN decoding process, and the second soft RAIN decoding process via the controller; and
  returning the embedded data of the codeword responsive to the detecting by the controller.

10. The method of claim 1, wherein each of the first, second, and third LLR sets are predefined and stored in the memory device.

11. A system for decoding data, comprising:
  a memory device; and
  a processing device coupled to the memory device, the processing device to perform operations comprising:
    decoding embedded data from a codeword retrieved from the memory device via a soft decoding process based on assigning respective log-likelihood ratio (LLR) values of a first LLR set assigned to bits of the codeword;
    accessing a set of bit-wise redundant array of independent NAND (RAIN) parity bits from the memory device or another memory device in response to determining failure of the soft decoding process;
    decoding the embedded data from the codeword via a first soft RAIN decoding process based on respective LLR values of a second LLR set assigned to the bits of the codeword and the RAIN parity bits; and
    decoding the embedded data from the codeword via a second soft RAIN decoding process based on respective LLR values of a third LLR set assigned to the bits of the codeword and the RAIN parity bits in response to determining failure of the first soft RAIN decoding process.

12. The system of claim 11, wherein the second LLR set has at least one different LLR value relative to the third LLR set.

13. The system of claim 11, wherein the first LLR set and the second LLR set are equal.

14. The system of claim 11, further comprising providing a RAIN recovery process via the RAIN parity bits in response to determining failure of the soft decoding process, wherein decoding the embedded data from the codeword via the first soft RAIN decoding process comprises decoding the embedded data from the codeword via the first soft RAIN decoding process in response to failure of the RAIN recovery procedure.

15. The system of claim 11, wherein at least one of the first and second LLR sets are based on a first range of high reliability error rate (HRER) of the memory device, wherein the third LLR set is based on a second range of HRER of the memory device, wherein HRER values of at least a portion of the second range of HRER of the memory device are greater than HRER values of the first range of HRER of the memory device.

16. A non-transitory computer-readable storage medium comprising instructions that, when executed by a processing device, cause the processing device to perform operations comprising:
  determining by an error-handling module of a controller, that a codeword received from a memory device has errors;
  decoding embedded data from the codeword via a soft decoding process based on respective log-likelihood ratio (LLR) values of a first LLR set assigned to bits of the codeword by the controller;
  accessing a set of bit-wise redundant array of independent NAND (RAIN) parity bits from the memory device or another memory device by the controller in response to determining failure of the soft decoding process;

decoding the embedded data from the codeword via a first soft RAIN decoding process based on respective LLR values of a second LLR set assigned to the bits of the codeword and the RAIN parity bits by the controller; and decoding the embedded data from the codeword via a second soft RAIN decoding process based on respective LLR values of a third LLR set assigned to the bits of the codeword and the RAIN parity bits by the controller in response to determining failure of the first soft RAIN decoding process.

17. The medium of claim 16, wherein the second LLR set has at least one different LLR value relative to the third LLR set.

18. The medium of claim 16, wherein the first LLR set and the second LLR set are equal.

19. The medium of claim 16, further comprising providing a RAIN recovery procedure via the RAIN parity bits in response to determining failure of the soft decoding process, wherein decoding the embedded data from the codeword via the first soft RAIN decoding process comprises decoding the embedded data from the codeword via the first soft RAIN decoding process in response to failure of the RAIN recovery procedure.

20. The medium of claim 16, wherein at least one of the first and second LLR sets are based on a first range of high reliability error rate (HRER) of the memory device, wherein the third LLR set is based on a second range of HRER of the memory device, wherein HRER values of at least a portion of the second range of HRER of the memory device are greater than HRER values of the first range of HRER of the memory device.

* * * * *